United States Patent [19]

Westbrook

[11] Patent Number: 4,516,751
[45] Date of Patent: May 14, 1985

[54] WALL BRACKET SYSTEM

[76] Inventor: Charles Westbrook, 182 Flying Mist Isle, Foster City, Calif. 94404

[21] Appl. No.: 419,349

[22] Filed: Sep. 17, 1982

[51] Int. Cl.³ .............................................. E04G 3/00
[52] U.S. Cl. .................................. 248/276; 248/279; 248/181
[58] Field of Search ............... 248/276, 285, 296, 279, 248/280.1, 288.3, 481

[56] References Cited

U.S. PATENT DOCUMENTS

| | | | |
|---|---|---|---|
| 844,083 | 2/1907 | Barrella | 248/279 |
| 4,068,961 | 1/1978 | Ebner et al. | 248/181 X |
| 4,415,136 | 11/1983 | Knoll | 248/181 |

Primary Examiner—Ramon S. Britts
Assistant Examiner—Sarah A. Lechok
Attorney, Agent, or Firm—Townsend & Townsend

[57] ABSTRACT

A vertically adjustable bracket for supporting equipment, such as video display devices, includes a mechanism for orienting the devices at a desired angle and inclination. The mechanism includes a support plate having a spherical bearing surface which is received in a circular aperture in a bracket arm. The mounting plate is held in place by a threaded shaft which is secured to a slot formed in the spherical bearing surface by a nut. Rotation of the threaded shaft by a knob causes a linkage to incline the mounting plate to a desired inclination.

11 Claims, 6 Drawing Figures

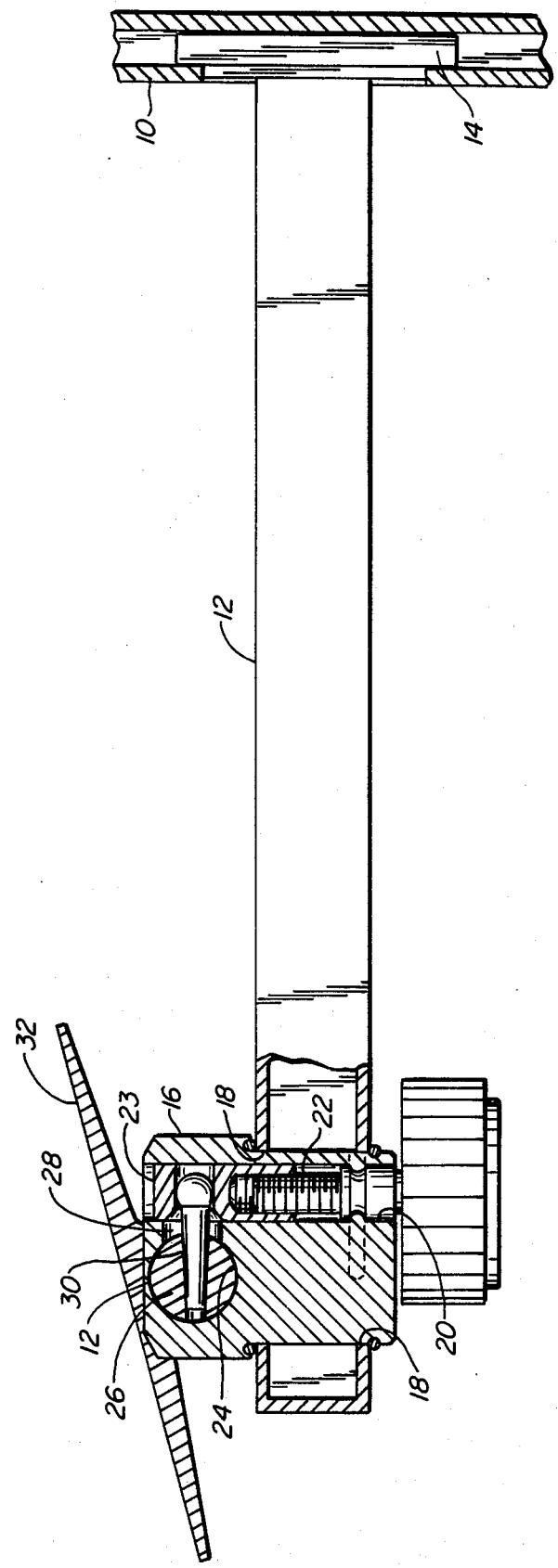
FIG.—1.
(PRIOR ART)

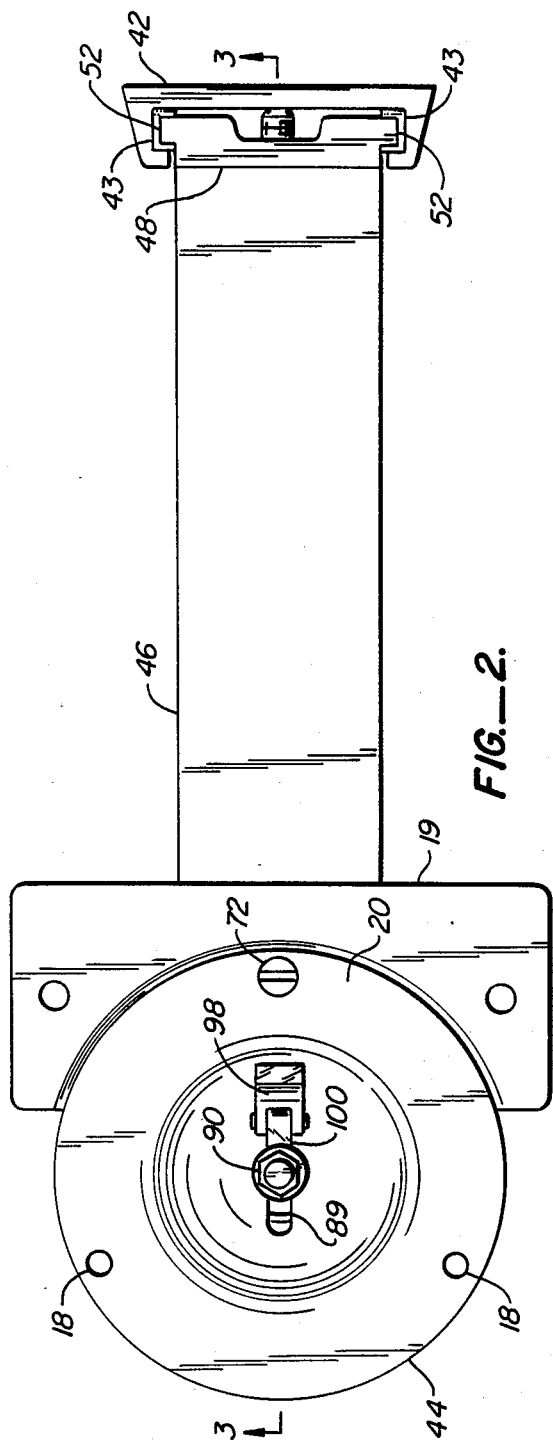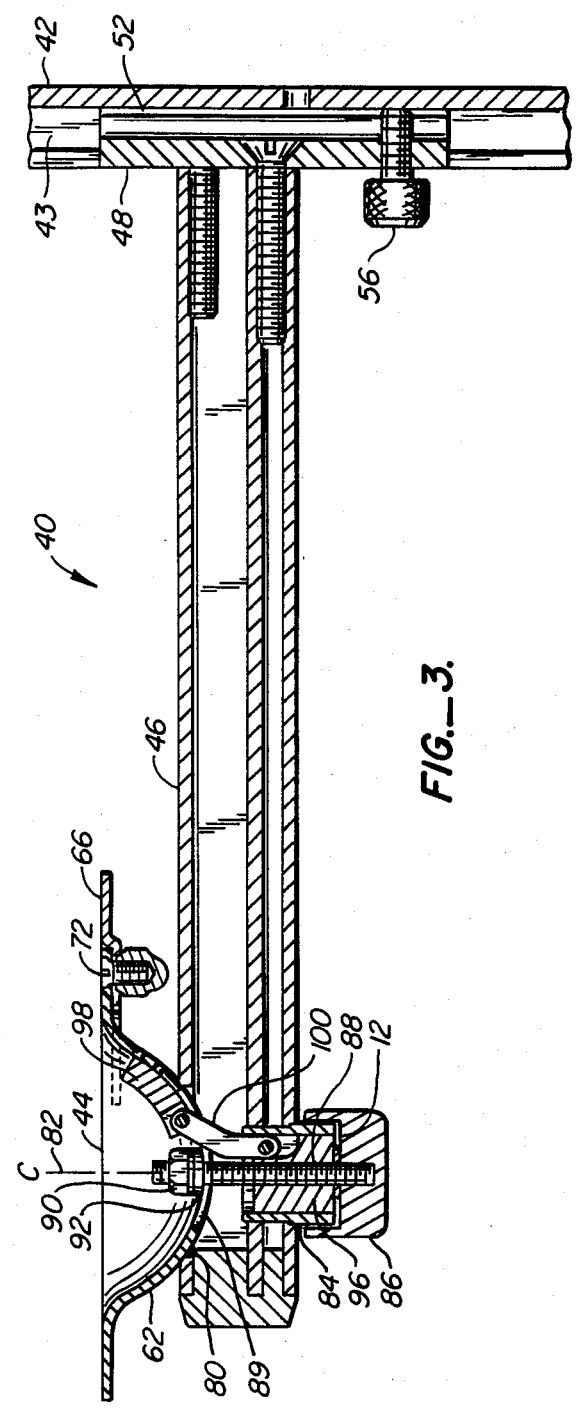

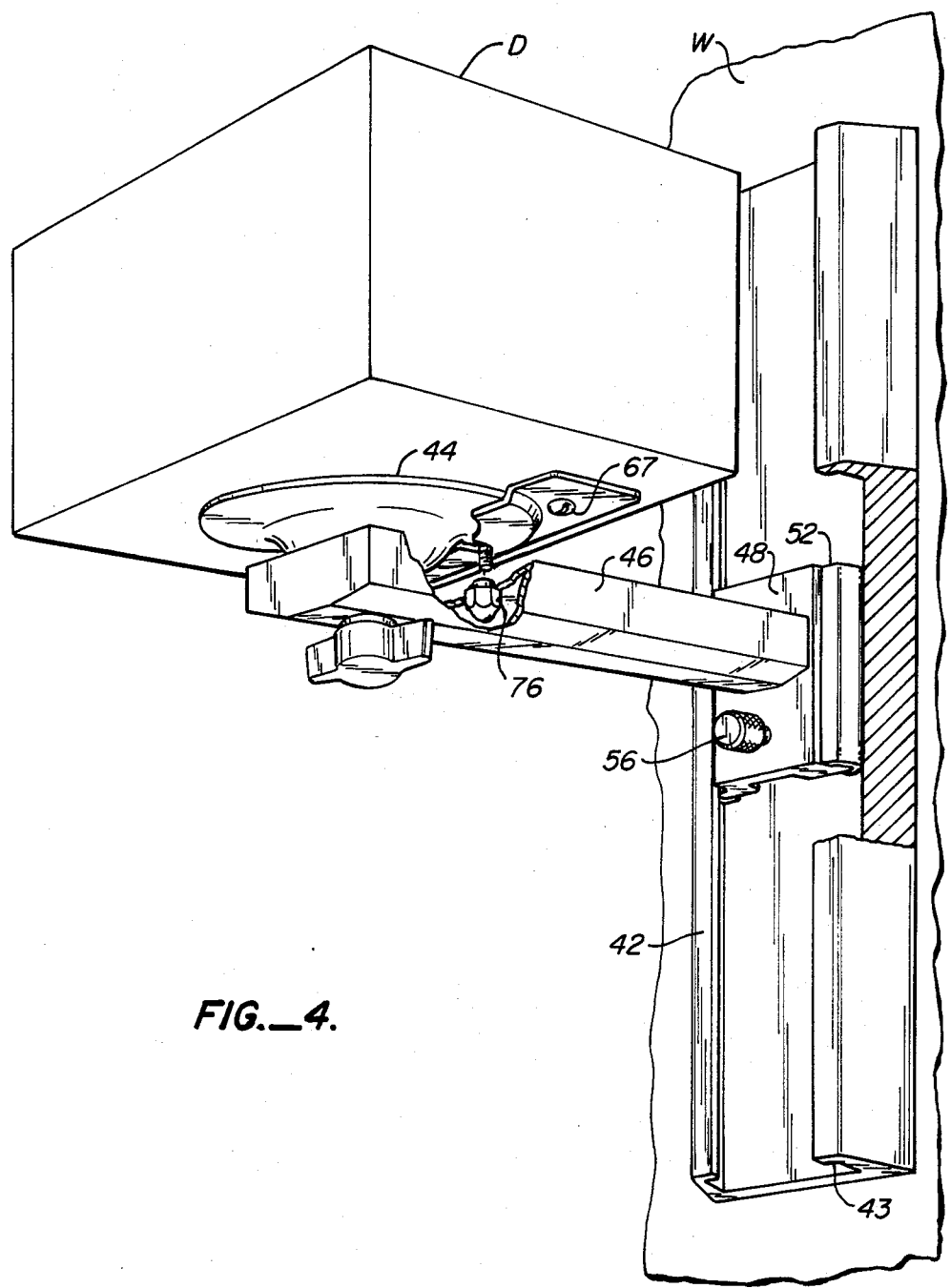
FIG._4.

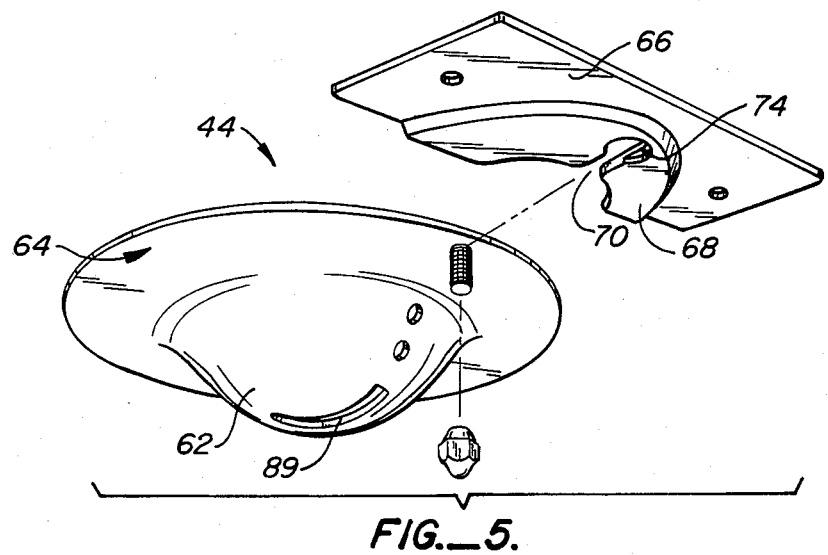
FIG._5.
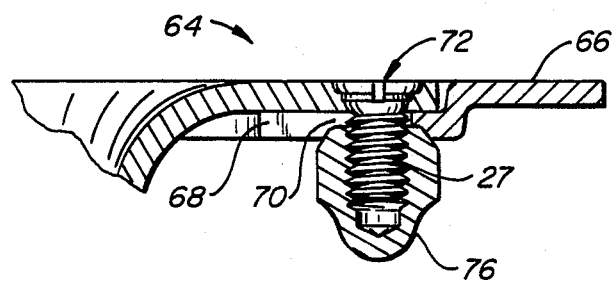
FIG._6.

WALL BRACKET SYSTEM

BACKGROUND OF THE INVENTION

1. Field of the Invention

The present invention relates generally to systems for wall mounting objects, and more particularly to a vertically adjustable bracket which is slidably mounted in a track secured to the wall or other vertical surface.

Electronic equipment such as biomedical monitoring equipment, television receivers, and other equipment having visual displays which must be located to provide convenient visual access for the user, are usually mounted on shelves or tables which may or may not be specially designed to support the equipment. Often the equipment is not fastened to the surface of the shelf or table and is prone to falling off because of accidental pushing, vibration caused by nearby equipment, and the like. Moreover, placement on a shelf often limits visual access to the equipment and the ability to reposition the equipment on the shelf is usually very limited. Even in the case of mobile tables or carts, it is usually difficult or impossible to vertically adjust the height of the equipment over a wide range. For these reasons, it would be desirable to provide a wall-mounting system for objects, usually electronic equipment, where the vertical position of the object is easily adjustable and where the object may be easily aligned with the line of sight of the user.

2. Description of the Prior Art

Fixed wall brackets have long been available for supporting electronic equipment such as monitoring equipment and television receivers. Although such fixed brackets avoid the problem of falling associated with shelves and carts, they suffer from other drawbacks. Most notably, the position of the equipment is fixed and the angle of viewing cannot easily be changed. If the room in which the equipment is used is rearranged, it will often be necessary to remount the equipment on an entirely new bracket so that the visual output will be properly aligned. Moreover, servicing of the electronic equipment mounted on fixed brakets is difficult, often requiring that the equipment be taken down from a relatively high location.

To overcome the problems associated with such fixed wall brackets, a vertically adjustable wall bracket having the capability of adjustably aligning the electronic equipment mounted thereon has been developed. Such systems are available from the GCX Corporation of San Rafael, Calif., under the tradenames PolyMount biomedical monitor mounting systems and PolyQuip equipment rail systems.

The operative features of each of these systems are generally the same and are illustrated in FIG. 1. An elongate track 10 is mounted on a wall or other vertical surface to define a vertical path. A vertically adjustable bracket arm 12 includes a slide 14 at one end which travels up and down in the track 10. The slide 14 is frictionally retained within the track 10. A particular tilt mechanism is located at the opposite end of the bracket arm 12 and comprises a cylindrical plug 16 received through a pair of circular, aligned holes 18 through the bracket arm 12. The plug 16 includes an axial, cylindrical passage 20 which is radially offset from the central axis of the plug. A threaded shaft 22 is mounted in the cylindrical passage 20 and an internally threaded cylinder 23 engages the threaded shaft 22 at one end and is also located in the passage 20.

A second cylindrical passage 24 is transversely formed in the plug 16 and rotatably receives a cylinder 26 therethrough. The second passage 24 is oriented perpendicularly to the first passage 20, and both passages are interconnected by a third passage at 28, as illustrated. A lever 30 is inserted radially into the cylinder 26 and pivotally secured at its opposite end to the cylinder 23. Thus, by rotating the threaded shaft 22, the threaded cylinder 23 will be caused to translate within passage 20, turning lever 30 and rotating cylinder 26. The plug 16 remains able to rotate within the hole 18 regardless of the position of the cylinder 26.

A mounting plate 32 or other support for the equipment is mounted on the cylinder 26 for attachment of the electronic equipment. The electronic equipment may thus be visually aligned as desired by rotating the plug 16 in the hole 18 and also tilting the cylinder 26 as described hereinbefore.

The apparatus just described is generally functional, although it suffers from certain drawbacks. In particular, the mounting of the bracket 32 on the cylinder 26 has been found particularly weak, limiting the weight of any apparatus to be mounted thereon. Moreover, the device must be secured to the plate 32 by a plurality of screws, which makes removing the device inconvenient and time consuming. Further, the lever 30 must be confined within the plug 16 and is therefore very limited as to its length, causing the leverage ratio of the objects weight translated to the lever 30 the cylinders 23 and threaded shaft 22 to be exceedingly high causing considerable stress to these and other parts of the assembly.

SUMMARY OF THE INVENTION

The present invention overcomes the problems of the prior art device by providing an improved swivel and tilt mechanism for mounting electronic equipment on a bracket arm. The mechanism comprises a mounting plate having a generally spherical bearing surface which is mounted in a socket formed near the distal end of the bracket arm. The spherical bearing surface and the socket together form a "ball and socket" type joint which allows the mounting plate to both rotate in the socket and tilt relative to the plane of the bracket arm. A mechanism is provided for retaining the mounting plate within the socket and for tilting the plate relative to the bracket arm to a desired inclination.

In the preferred embodiment, the tilting mechanism comprises a radial slot formed in the spherical bearing surface of the mounting plate. A threaded shaft is rotatably secured to the bracket arm and projects through the radial slot, allowing the mounting plate to be secured by a nut. The mounting plate is able to rotate about the shaft and is also able to tilt along a path defined by the radial slot.

A mechanism for positively tilting the mounting plates utilizes a block having a threaded passage therethrough, which passage receives the threaded shaft. Rotation of the threaded shaft axially translates the block relative to the mounting plate. A linking arm connects the mounting plate to the block so that the mounting plate is forced to tilt relative to the shaft and the bracket arm as the shaft is rotated.

BRIEF DESCRIPTION OF THE DRAWINGS

FIG. 1 illustrates the wall bracket system of the prior art.

FIG. 2 is a top view of the wall bracket of the present invention.

FIG. 3 is a side elevational view taken along line 3—3 of FIG. 2.

FIG. 4 is a perspective view illustrating the wall bracket system of the present invention.

FIG. 5 is a perspective view illustrating the mounting plate of the present invention.

FIG. 6 is a cross-sectional view of the removable retaining plate mounted on the mounting plate of the present invention.

DESCRIPTION OF THE PREFERRED EMBODIMENT

Referring to FIGS. 2, 3 and 4, the bracket support system of the present invention comprises a bracket arm 40 in combination with a channel member 42. The channel member 42 defining tracks 43 will be permanently affixed to a wall W or other vertical surface, allowing the bracket arm 40 to slide up and down the channel along a path defined by the channel. A mounting plate 44 for securing a device D, typically an electronic display device, is mounted at the distal end of the bracket arm 40. The mounting plate 44 may be both rotated and tilted by the novel positioning mechanism of the present invention, which will be described in detail hereinafter. Such positioning of the device D facilitates viewing of the device by a user at any location in the room.

The bracket arm 40 comprises an elongate beam 46 having a block 48 secured at one end thereof and the mounting plate 44 secured at the opposite end. The beam 46 should be formed of a light, strong material capable of supporting the expected weight of the device D to be supported. Conveniently, the beam 46 may be formed of extruded aluminum having a hollow core to reduce weight.

A pair of runners 52 are secured along opposite edges of the block 48 and received in tracks 43 formed in the channel member 42. The runners 52 are formed from a lubricous material, such as nylon, which allows the block 48 to slide up and down the channel 42. By placing a weight on the mounting plate 44, the bracket arm 40 is canted relative to the channel member 42 which prevents the bracket arm from sliding downward. To further assure that the bracket arm 40 remains in place, a set screw 56 is provided in the block 48.

Referring now also to FIG. 5, the mounting plate 44 includes a generally spherical bearing surface 62 having a flange 64 thereabout. The flange 64 defines a substantially flat support surface for the device D.

To secure the device D to the flange 64, a retaining plate 66 is affixed to the bottom of the device D, as illustrated in FIG. 4, by screws 67. The plate 66 includes a semi-circular depression 68 having dimensions so that the flange 64 on the mounting plage 64 can be inserted into the space defined by the depression and the bottom of the device D. A slot 70 is formed in the edge of the depression 68 and located to receive a post 27 (FIG. 6) which projects downward from the flange 64. A detent 74 is formed around the slot 70 so that a nut 76 which is threadably received on post 72 is received by the detent when the retaining plate 66 is mounted on the flange 64. In this way, the device D can be securely attached to the mounting plate 44 merely by placing the retaining plate 66 over the flange 64 and tightening the nut 76.

The spherical bearing surface 62 of the mounting plate 44 is received in a circular aperture 80 formed in the upper surface (as viewed in FIG. 3) of the beam 46.

Thus, without any further attachment, the mounting plate 44 would be able to both rotate and tilt within the aperture 80 on the bearing surface 62. Rotation is considered to be circular motion about axis 82, while tilting is motion about any horizontal axis which passes through the center C of the spherical bearing 62. A novel positioning mechanism for retaining the mounting plate 44, within the aperture 80 is provided which allows a wide range of orientations for the mounting plate to be selected and maintained.

The positioning mechanism for securing the mounting plate 44 comprises a bearing sleeve 84 mounted concentrically with the circular aperture 80 and projecting through the opposite side of the beam 46. A knob 86 is rotatably received on the outer end of the bearing sleeve 84 and a threaded shaft 88 projects therefrom through the bearing sleeve 84 upward through the slot 89 formed in the spherical bearing 62.

The mounting plate 44 is secured to the shaft 88 by a nut 90 and a washer 92. The washer 92 allows rotation of the shaft 88 without loosening of the nut 90. Usually, a second nut (not shown) will be added to further assure that loosening will not occur. With the mechanism so far described in place, it will be appreciated that the mounting plate 44 can be rotated about the shaft 88 by applying a rotational force to the plate. Moreover, the mounting plate 44 can be tilted about an axis normal to the axis of slot 89 by pressing at the appropriate location on the flange 64.

The positioning mechanism further includes means for tilting the mounting plate 44 and for maintaining the mounting plate at a desired inclination. An internally threaded block 96 is mounted on the shaft 88 and connected to a dog 98 mounted on the internal surface of the spherical bearing 62 by a linking arm 100 which is pivotally connected at one end to the dog 98 and at the other end to the block 96. Such connection effectively prevents the block 96 from rotating so that as the shaft 88 is turned by knob 86, the block is translated axially along the shaft. Such motion, in turn, is transmitted to the mounting plate 44 by the linking arm 100 which causes the mounting plate to tilt upward or downward at the end where the dog 96 is mounted. The mounting plate 44 maintains a fixed inclination when the knob 86 is not rotated because of the friction in the between threaded shaft 88 and block 96.

Although the best mode contemplated for carrying out the present invention has been herein shown and described, it will be appreciated that variations and modifications may be made without departing from what is regarded to be the subject matter of the present invention.

What is claimed is:

1. A wall bracket system for vertically adjustably mounting a device on a vertical surface, said system comprising:
   a channel defining a generally linear path and having means for securing to the vertical surface;
   a bracket arm having means at one end for slidably engaging the channel so that said arm is capable of translating along the path, and further having a socket spaced inward from said one end;
   a mounting plate having a generally spherical bearing surface including a radial slot, said bearing surface being received within the socket of the bracket arm so that said mounting plate is simultaneously capable of rotating about an axis which is generally parallel to the vertical path and tilting relative to said axis; and means for retaining the mounting plate within the socket and for tilting the mounting plate relative to the vertical axis, said means for retaining including a threaded shaft rotatably secured to the bracket arm and projecting through the radial slot; means for rotating the shaft; a block having a threaded passage and mounted on the threaded shaft so that it translates along said shaft as said shaft is rotated; and means for operatively coupling the mounting plate to the block so that the mounting plate tilts within the socket as the shaft is rotated.

2. A wall bracket system as in claim 1, wherein the mounting plate is secured within the socket by a nut on the threaded shaft whereby the tightness of the frictional engagement between the spherical bearing surface and the socket can be adjusted by loosening or tightening the nut.

3. A wall bracket system as in claim 1, wherein the means for operatively coupling the mounting plates is a link pivotally secured at one end to the block and at the other end to the mounting plate.

4. A wall bracket system as in claim 1, wherein the bracket arm comprises an elongate beam which projects substantially perpendicularly from the channel when mounted thereon.

5. A wall bracket system as in claim 1, wherein the channel has a C-shaped cross section and which defines a pair of parallel tracks and wherein the means for slidably engaging the channel includes a pair of runners for sliding within said tracks.

6. A wall bracket system as in claim 5, wherein said runners are formed from a lubricous material.

7. A wall bracket system as in claim 1, wherein the socket is located at the end of the bracket arm opposite the means for engaging the channel.

8. In a wall bracket system including a channel for mounting on a vertical surface, an improved bracket arm comprising an elongate member having means at one end for slidably engaging the channel, the improvement comprising:

a mounting plate having a generally spherical bearing surface which includes a radial slot;

socket means located at the opposite end of the elongate member for receiving the spherical bearing surface to form a ball and socket joint which allows the mounting plate to rotate in a first plane which is generally horizontal when the bracket arm is mounted in the track and simultaneously to tilt in a second plane which is perpendicular to the first plane; and means for retaining the mounting plate within the socket and for tilting the mounting plate relative to the elongate member, said means for retaining and tilting includes a threaded shaft rotatably secured to the bracket arm and projecting through the radial slot; means for rotating the shaft; a block having a threaded passage and mounted on the threaded shaft so that it translates along said shaft as said shaft is rotated; and means for operatively coupling the mounting plate to the block so that the mounting plate tilts within the socket as the shaft is rotated.

9. An improved bracket arm as in claim 8, wherein the socket means comprises a circular hole in the elongate member.

10. An improved bracket arm as in claim 8, wherein the mounting plate is secured within the socket by a nut on the threaded shaft whereby the tightness of the frictional engagement between the spherical bearing surface and the socket can be adjusted by loosening or tightening the nut.

11. An improved bracket arm as in claim 8, wherein the means for operatively coupling the mounting plate is a link pivotally secured at one end to the block and at the other end to the mounting plate.

* * * * *